(12) United States Patent
Saito

(10) Patent No.: US 11,215,836 B2
(45) Date of Patent: Jan. 4, 2022

(54) DEFLECTOR, DISPLAY DEVICE, AND METHOD OF MANUFACTURING DEFLECTOR

(71) Applicant: SEIKO EPSON CORPORATION, Tokyo (JP)

(72) Inventor: Atsushi Saito, Chino (JP)

(73) Assignee: SEIKO EPSON CORPORATION, Tokyo (JP)

(*) Notice: Subject to any disclaimer, the term of this patent is extended or adjusted under 35 U.S.C. 154(b) by 40 days.

(21) Appl. No.: 16/105,553

(22) Filed: Aug. 20, 2018

(65) Prior Publication Data
US 2019/0056598 A1    Feb. 21, 2019

(30) Foreign Application Priority Data

Aug. 21, 2017 (JP) .............................. JP2017-158464

(51) Int. Cl.
*G02B 27/01* (2006.01)

(52) U.S. Cl.
CPC ..... *G02B 27/0176* (2013.01); *G02B 27/0172* (2013.01); *G02B 2027/011* (2013.01); *G02B 2027/013* (2013.01); *G02B 2027/0169* (2013.01); *G02B 2027/0174* (2013.01); *G02B 2027/0178* (2013.01)

(58) Field of Classification Search
CPC ... G02B 27/01–0103; G02B 2027/0105–0147; G02B 5/32; G02B 27/0172; G02B 27/0174; G03H 2001/043
See application file for complete search history.

(56) References Cited

U.S. PATENT DOCUMENTS

| | | | | |
|---|---|---|---|---|
| 3,904,282 A | * | 9/1975 | Batista | G02C 1/06 351/159.67 |
| 4,196,982 A | * | 4/1980 | Watkins | G02C 1/06 2/443 |
| 4,265,850 A | * | 5/1981 | Coulon | B29D 12/02 264/225 |

(Continued)

FOREIGN PATENT DOCUMENTS

JP     H10-301055 A    11/1998
JP     H10-319240 A    12/1998

(Continued)

*Primary Examiner* — Christopher Stanford
(74) *Attorney, Agent, or Firm* — Oliff PLC

(57) ABSTRACT

A deflector includes a support substrate including a curved portion that is curved along a first direction intersecting a thickness direction and that includes a convex curved surface convex to a first side in the thickness direction, a holographic element laminated on the curved portion, and a holder configured to hold the support substrate. The holographic element is configured to deflect light incident on the curved portion at least in the first direction. The holder includes a first fixing portion fixed to, in a thickness direction, a first supported portion that is an end portion of the curved portion of the support substrate on a first side in the first direction, and a second fixing portion fixed to, in the thickness direction, a second supported portion that is an end portion of the curved portion on a second side in the first direction by adhesive bonding and the like.

20 Claims, 14 Drawing Sheets

(56) References Cited

U.S. PATENT DOCUMENTS

| | | | |
|---|---|---|---|
| 7,097,305 B2* | 8/2006 | Delery | B29D 11/00932 |
| | | | 351/159.74 |
| 2008/0007688 A1* | 1/2008 | D'Agostino | G02C 1/06 |
| | | | 351/86 |
| 2010/0245755 A1* | 9/2010 | Sugihara | G02B 27/0172 |
| | | | 351/158 |
| 2014/0232619 A1 | 8/2014 | Hiraide | |
| 2015/0279114 A1 | 10/2015 | Yonekubo | |
| 2016/0349517 A1* | 12/2016 | Miyasaka | G02B 6/124 |

FOREIGN PATENT DOCUMENTS

| | | |
|---|---|---|
| JP | 2013-127489 A | 6/2013 |
| JP | 2014-160112 A | 9/2014 |
| JP | 2015-191026 A | 11/2015 |

* cited by examiner

DEFLECTOR, DISPLAY DEVICE, AND METHOD OF MANUFACTURING DEFLECTOR

The present application is based on and claims priority from JP Application Serial Number 2017-158464, filed Aug. 21, 2017, the disclosure of which is hereby incorporated by reference herein in its entirety.

BACKGROUND

1. Technical Field

The disclosure relates to a deflector including a holographic element, a display device, and a method of manufacturing the deflector.

2. Related Art

With a display device including a deflection element that makes light emitted from an image light projector enter the eye of a viewer, the use of a holographic element serving as the deflection element allows the display device to have a curved shape conforming to the face of the viewer (refer to JP-A-2015-191026). JP-A-2015-191026 discloses a structure such that the holographic element is laminated on one face of a curved support substrate. However, JP-A-2015-191026 fails to disclose a structure such that the holographic element is fixed to a holder such as a holder for an eyeglasses frame.

In the structure disclosed in JP-A-2015-191026, as illustrated in FIG. 18, a holographic element 30 is laminated on a support substrate 20 including a curved portion 21, a first flat portion 291 and a second flat portion 292 which are coupled to each other through a first bent portion 281 and a second bent portion 282 are provided in the curved portion 21, and thus the first flat portion 291 and the second flat portion 292 are fixed to a first fixing portion 611 and a second fixing portion 612 of the holder 61.

However, in the structure illustrated in FIG. 18, the first bent portion 281 and the second bent portion 282 are located between the first fixing portion 611 and the second fixing portion 612. This structure may cause the curved portion 21 to be heavily deformed between the first bent portion 281 and the second bent portion 282 in the support substrate 20, when, for example, the support substrate 20 expands due to a change in environmental temperature. As a result, the holographic element 30 may also be heavily deformed as illustrated by the dashed line L30. The deformation may cause interference fringes 39 of the holographic element 30 to change from the state represented by the dotted line to the state represented by the solid line as illustrated in FIG. 19, resulting in a significant change in diffraction angle.

The disclosure provides a deflector, a display device, and a method of manufacturing the deflector, which are capable of suppressing the deformation of the holographic element.

SUMMARY

A deflector according to one aspect of the disclosure includes a support substrate including a curved portion that is curved along a first direction intersecting a thickness direction, the curved portion including a convex curved surface convex to a first side in the thickness direction, a holographic element laminated on at least one of a first surface and a second surface of the curved portion in the thickness direction, and configured to deflect and output light that is incident toward the curved portion, and a holder configured to hold the support substrate, wherein the holder includes a first fixing portion that overlaps with a first supported portion in the thickness direction and that fixed to the first supported portion, the first supported portion being a part of the curved portion on a first side in the first direction, and a second fixing portion that overlaps with a second supported portion an the thickness direction and that is fixed to the second supported portion, the second supported portion being a part of the curved portion on a second side in the first direction.

In the disclosure, the holographic element is laminated on the curved portion of the support substrate and configured to deflect and output light incident toward the curved portion. The first fixing portion and the second fixing portion of the holder overlap with the first supported portion and the second supported portion in the thickness direction and are fixed to the first supported portion and the second supported portion, respectively, the first supported portion and the second supported portion being spaced apart from each other in the first direction in the curved portion of the support substrate. Accordingly, the support substrate includes no bent portion between the first fixing portion and the second fixing portion of the holder (between the first supported portion and the second supported portion of the support substrate). Therefore, even when expansion or contraction occurs in the support substrate, the deformation of the support substrate in the first direction is suppressed by the holder. As a result, the deformation of the holographic element in the first direction is suppressed, thus making it hard to cause an incident such as a change in the diffraction angle of the holographic element in the first direction.

In the disclosure, an aspect such that the holder has a lower thermal expansion coefficient than the support substrate may be adopted. According to the aspect, even when expansion or contraction occurs in the support substrate due to a change in environmental temperature, the deformation of the support substrate is effectively suppressed by the holder.

In the disclosure, an aspect such that the holder has a higher elastic modulus than the support substrate may be adopted. According to the aspect, even when expansion or contraction occurs in the support substrate due to a change in environmental temperature, the deformation of the support substrate is effectively suppressed by the holder.

In the disclosure, an aspect may be adopted such that the first fixing portion is bent to overlap with a first side face that is a side face of the support substrate on the first side in the first direction and to be fixed to the first side face, and the second fixing portion is bent to overlap with a second side face that is a side face of the support substrate on the second side in the first direction and to be fixed to the second side face. According to the aspect, the deformation of the support substrate is effectively suppressed by the holder.

In the disclosure, an aspect such that the support substrate in the first direction as a whole constitutes the curved portion may be adopted.

An the disclosure, an aspect may be adopted such that the support substrate includes a first flat portion that is coupled to the curved portion on the first side in the first direction through a first bent portion, and the first fixing portion overlaps with the first supported portion and the first flat portion in the thickness direction and is fixed to the first supported portion and the first flat portion. According to the aspect, the support substrate and the holder are fixed to each other through an overlapping part between the first fixing portion and the first flat portion.

In the disclosure, an aspect may be adopted such that the support substrate includes a second flat portion that is coupled to the curved portion on the second side in the first direction through a second bent portion, and the second fixing portion overlaps with the second supported portion and the second flat portion in the thickness direction and is fixed to the second supported portion and the second flat portion. According to the aspect, the support substrate and the holder are fixed to each other through an overlapping part between the second fixing portion and the second flat portion.

In the disclosure, an aspect may be adopted such that the curved portion includes a central portion in the first direction, a width of the central portion in a second direction intersecting the first direction is longer than each of a width of the curved portion in the second direction on the first side in the first direction and a width of the curved portion in the second direction on the second side in the first direction, when viewed from the thickness direction.

In the disclosure, an aspect may be adopted such that a supporting film is laminated on a surface of the holographic element, the surface being on an opposite side to the support substrate in a region overlapping with the curved portion in the thickness direction.

In the disclosure, an aspect may be adopted such that a cover substrate is laminated on a surface of the supporting film, the surface being on an opposite side to the holographic element in a region overlapping with the curved portion in the thickness direction.

In the disclosure, an aspect such that the curved portion is curved along a second direction intersecting the first direction may be adopted.

In that case, an aspect such that the holographic element deflects the light incident toward the curved portion in the first direction and the second direction may be adopted.

In the disclosure, an aspect may be adopted such that the curved portion is curved along a second direction intersecting the first direction, the holographic element deflects the light incident toward the curved portion in the first direction and the second direction, the holder includes a third fixing portion configured to hold an end portion of the support substrate on a first side in the second direction intersecting both the first direction and the thickness direction and a fourth fixing portion configured to hold an end portion of the support substrate on a second side in the second direction, the third fixing portion overlaps with a third supported portion in the thickness direction and is fixed to the third supported portion, the third supported portion being a part of the curved portion on the first side in the second direction, and the fourth fixing portion overlaps with a fourth supported portion in the thickness direction and is fixed to the fourth supported portion, the fourth supported portion being a part of the curved portion on the second side in the second direction. According to the aspect, the holographic element is configured to deflect and output in the first direction and the second direction the light incident toward the curved portion. The third fixing portion and the fourth fixing portion of the holder overlap with the third supported portion and the fourth supported portion in the thickness direction and are fixed to the third supported portion and the fourth supported portion, respectively, the third fixing portion and the fourth fixing portion being spaced apart from each other in the second direction in the curved portion of the support substrate. Accordingly, the support substrate includes no bent portion between the third fixing portion and the fourth fixing portion of the holder (between the third supported portion and the fourth supported portion of the support substrate), Therefore, even when expansion or contraction occurs in the support substrate, the deformation of the support substrate in the second direction is suppressed by the holder. As a result, the deformation of the holographic element in the second direction is suppressed, thus making it hard to cause an incident such that the diffraction angle of the holographic element in the second direction changes.

One aspect of a display device includes the deflector to which the disclosure applies, and an image light projector configured to project image light from a second side in the thickness direction to the curved portion and from the first side in the first direction.

An aspect may be adopted such that the display device according to the disclosure includes a frame configured to hold the support substrate and be mounted on the head of a viewer to position the holographic element in front of an eye of the viewer, and the holder is a part of the frame.

In the disclosure, an aspect such that the first direction is a left-and-right direction, and the thickness direction is a front-and-rear direction may be adopted. In the disclosure, an aspect such that the first direction is an up-and-down direction, and the thickness direction is a front-and-rear direction may be adopted.

One aspect of a method of manufacturing the deflector to which the disclosure applies includes forming a holographic material layer on the support substrate to form the holographic element, fixing a resulting support substrate to the holder, and performing interference exposure including illuminating the holographic material layer with an object beam and a reference beam. According to the aspect, in manufacturing the deflector, even when expansion or contraction occurs in the support substrate due to a change in environmental temperature, the deformation of the support substrate is suppressed by the holder. As a result, the deformation of the holographic element is suppressed, thus making it hard to cause an incident such that the diffraction angle of the holographic element changes.

BRIEF DESCRIPTION OF THE DRAWINGS

Embodiments of the disclosure will be described with reference to the accompanying drawings, wherein like numbers reference like elements.

DESCRIPTION OF EXEMPLARY EMBODIMENTS

Exemplary embodiments of the disclosure will be described below. In the following description, a left-and-right direction (horizontal direction) is referred to as X, an up-and-down direction as Y, and a front-and-rear direction as Z.

Exemplary Embodiment 1

Configuration of Display Device

Figure 1:
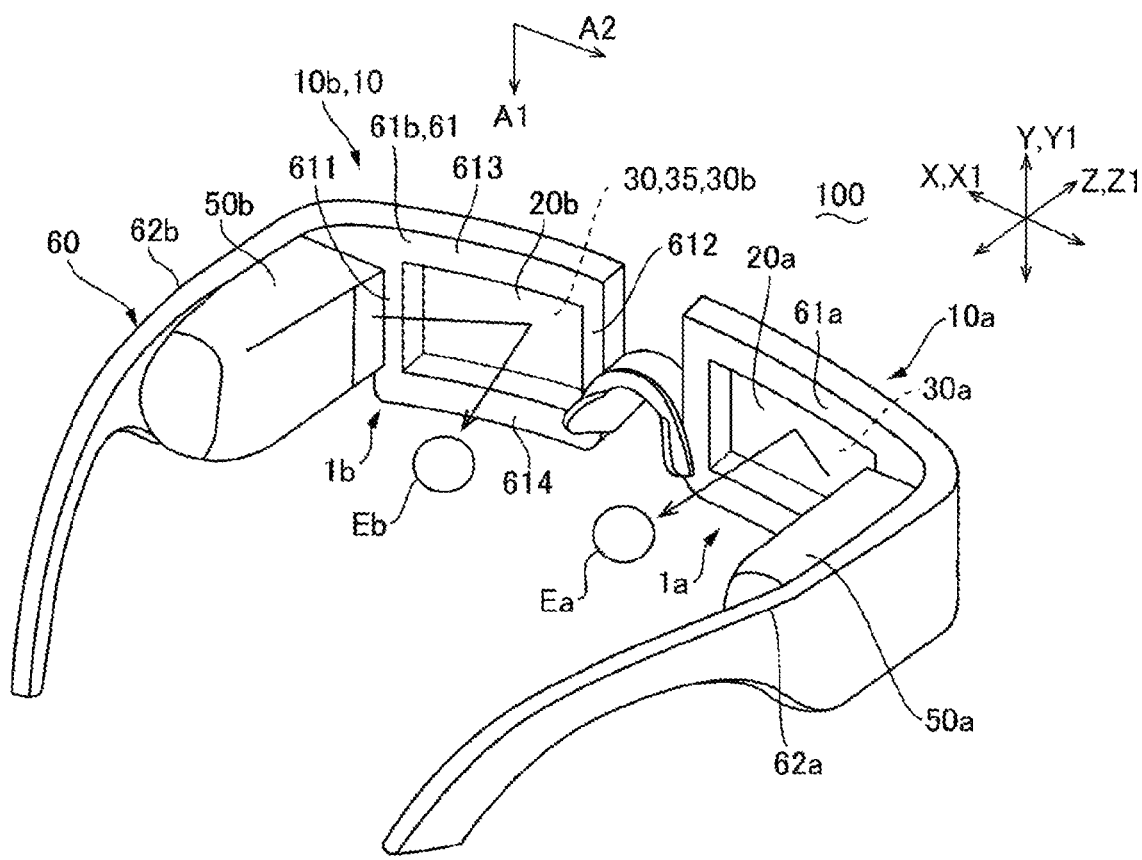
FIG. 1 illustrates an example of an appearance of a display device according to Exemplary Embodiment 1 of the disclosure.

FIG. 1 illustrates an example of an appearance of a display device 100 according to Exemplary Embodiment 1 of the disclosure. In FIG. 1, the display device 100 of Exemplary Embodiment 1 is configured to be a head mounted display device. The display device 100 includes a right-eye image light projector 50a, right-eye holographic element 30a that deflects image light emitted from the right-eye image light projector 50a to make the image light enter a right eye Ea of a viewer, a left-eye image light projector 50b, and a left-eye holographic element 30b that deflects image light emitted from the left-eye image light projector 50b to make the image light enter a left eye Eb of the viewer.

The display device 100 has, for example, an eyeglasses shape. Specifically, the display device 100 includes a frame 60 that holds the right-eye image light projector 50a, the right-eye holographic element 30a, the left-eye image light projector 50b, and the left-eye holographic element 30b, and the frame 60 is to be mounted on the head of the viewer. The frame 60 includes a right-eye holder 61a that holds the right-eye holographic element 30a and a left-eye holder 61b that holds the left-eye holographic element 30b. The frame 60 includes a right temple 62a to be hooked to the right ear of the viewer and a left temple 62b to be hooked to the left ear of the viewer, and the right-eye image light projector 50a and the left-eye image light projector 50b are attached to temples 62a and 62b, respectively. When the display device 100 is mounted on the head through the frame 60, the right-eye holographic element 30a is located in front of the right eye Ea, and the left-eye holographic element 30b is located in front of the left eye Eb.

Configuration of Left-Eye Optical System 1b

Figure 2:
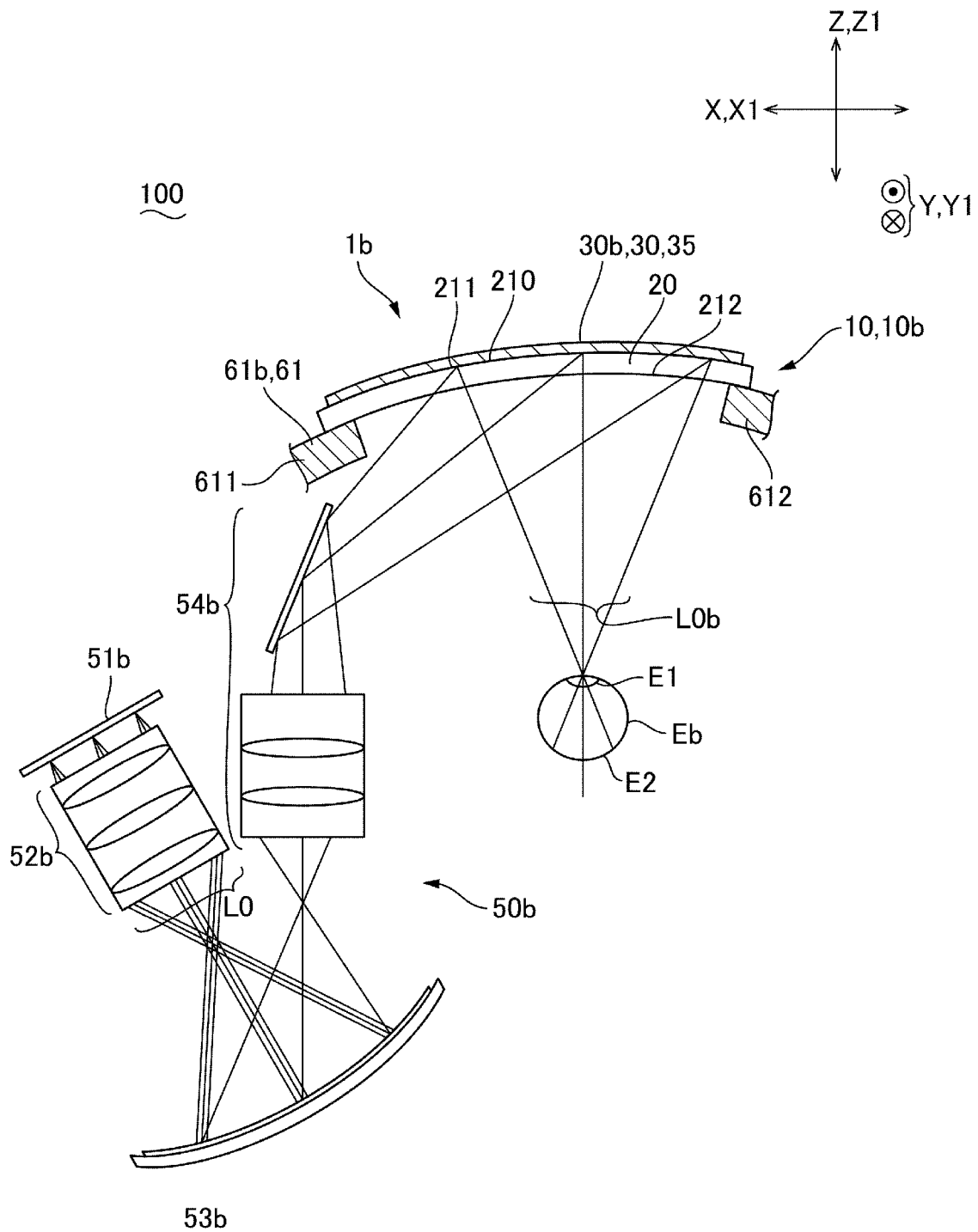
FIG. 2 illustrates an example of an optical system of the display device illustrated in FIG. 1.

FIG. 2 illustrates an example of an optical system of the display device 100 illustrated in FIG. 1. In the display device 100 illustrated in FIG. 1, a right-eye optical system 1a between the right-eye image light projector 50a and the right eye Ea and a left-eye optical system 1b between the left-eye image light projector 50b and the left eye Eb have the same basic configuration. Accordingly, FIG. 2 illustrates just the left-eye optical system 1b, and explanation for the right-eye optical system 1a is omitted. FIG. 2 also illustrates a beam at the center and beams at both ends of each angle of view of image light. To simplify the figure, the beams traveling after being reflected on a correction diffraction element 53b are each represented by the central light beam of the corresponding angle of view, and the other beams are not illustrated.

As illustrated in FIG. 2, in the left-eye optical system 1b, the left-eye image light projector 50b includes an image light generator 51b that emits image light L0 and a projection optical system 52b that projects the image light L0 emitted from the image light generator 51b. The left-eye image light projector 50b includes the correction diffraction element 53b and a correction optical system 54b. An image generated by the image light generator 51b passes through the projection optical system 52b, the correction diffraction element 53b, and the correction optical system 54b to travel to the left-eye holographic element 30b, and is then deflected toward the left eye Eb of the viewer by the left-eye holographic element 30b.

The image light generator 51b includes a display panel such as an organic electroluminescent display device. The image light generator 51b may be configured to include, as the display panel, a liquid crystal panel that modulates source light emitted from a light source (not illustrated). The projection optical system 52b includes optical elements such as a lens and a mirror. The projection optical system 52b has a function that controls an emission angle of the image light, and thus adjusts the beams of image light emitted at respective points on the image light generator 51b to output collimated light fluxes having angles corresponding to the respective points. The correction diffraction element 53b has the same basic configuration as the left-eye holographic element 30b, and is formed from a reflective volume holographic element. The correction diffraction element 53b corrects wavelength dependence of the left-eye holographic element 30b for diffraction angles. The correction optical system 54b includes optical elements such as a lens and a mirror. The correction optical system 54b has a function that corrects an aberration of the image light L0 such as distortion, thus effectively guiding the image light L0 deflected by the correction diffraction element 53b to the left-eye holographic element 30b.

The image light generator 51b may include, for example, a light source, a scanning optical system that performs scanning with light flux emitted from the light source, and a light guide system. In that configuration, a laser device used as the light source emits light fluxes with light intensities modulated corresponding to the respective dots of an image to be displayed, and the scanning optical system performs two-dimensional scanning with modulated light emitted from the light source to generate the image.

The left-eye holographic element 30b is a refractive volume holographic element, and forms a partially transmissive combiner. Thus, natural light enters the left eye Eb through the left-eye holographic element 30b, and accordingly the viewer recognizes an image in which image light L0a generated by the display device 100 is superimposed on the natural light (background). The left-eye holographic element 30b is curved so that its convex curved surface is convex to a side opposite to the left eye Eb side of the viewer, and the left-eye image light projector 50*b* projects the image light L0 from the convex curved surface side of the left-eye holographic element 30*b*.

In the display device 100 having the configuration described above, the left-eye holographic element 30*b*, the left-eye holder 61*b*, and a left-eye support substrate 20*b* supported by the left-eye holder 61*b* forms a left-eye deflector 10*b* together, and the left-eye holographic element 30*b* is laminated on one face of the left-eye support substrate 20*b* in a thickness direction.

Configuration of Deflector 10

The left-eye deflector 10*b* described above and a right-eye deflector 10*a* are symmetrically arranged and have the same basic configuration. Accordingly, in the following description, the left-eye deflector 10*b*, the left-eye holder 61*b*, the left-eye support substrate 20*b*, and the left-eye holographic element 30*b* are referred to as a deflector 10, a holder 61, a support substrate 20, and a holographic element 30, respectively, regardless of whether those are each for the left eye or the right eye. In the following description, a first direction is referred to as X1, a second direction as Y1, and the thickness direction of the support substrate 20 as Z1. Furthermore, one side in the first direction X1 is referred to as X1*a*, the other side as X1*b*, one side in the second direction Y1 as Y1*a*, the other side in the second direction Y1 as Y1*b*, one side in the thickness direction Z1 as Z1*a*, and the other side in the thickness direction Z1 as Z1*b*. In Exemplary Embodiment 1, the first direction X1 corresponds to an X direction left- and right-direction, horizontal direction) in FIG. 1, the second direction Y1 corresponds to a Y direction (up-and-down direction) in FIG. 1, and the third direction Z1 corresponds to a Z direction (front-and-rear direction) in FIG. 1. In the third direction Z1, the one side Z1*a* corresponds to a side opposite to the eye of the viewer, and the other side Z1*b* is located on a side with the eye of the viewer.

Figure 3:
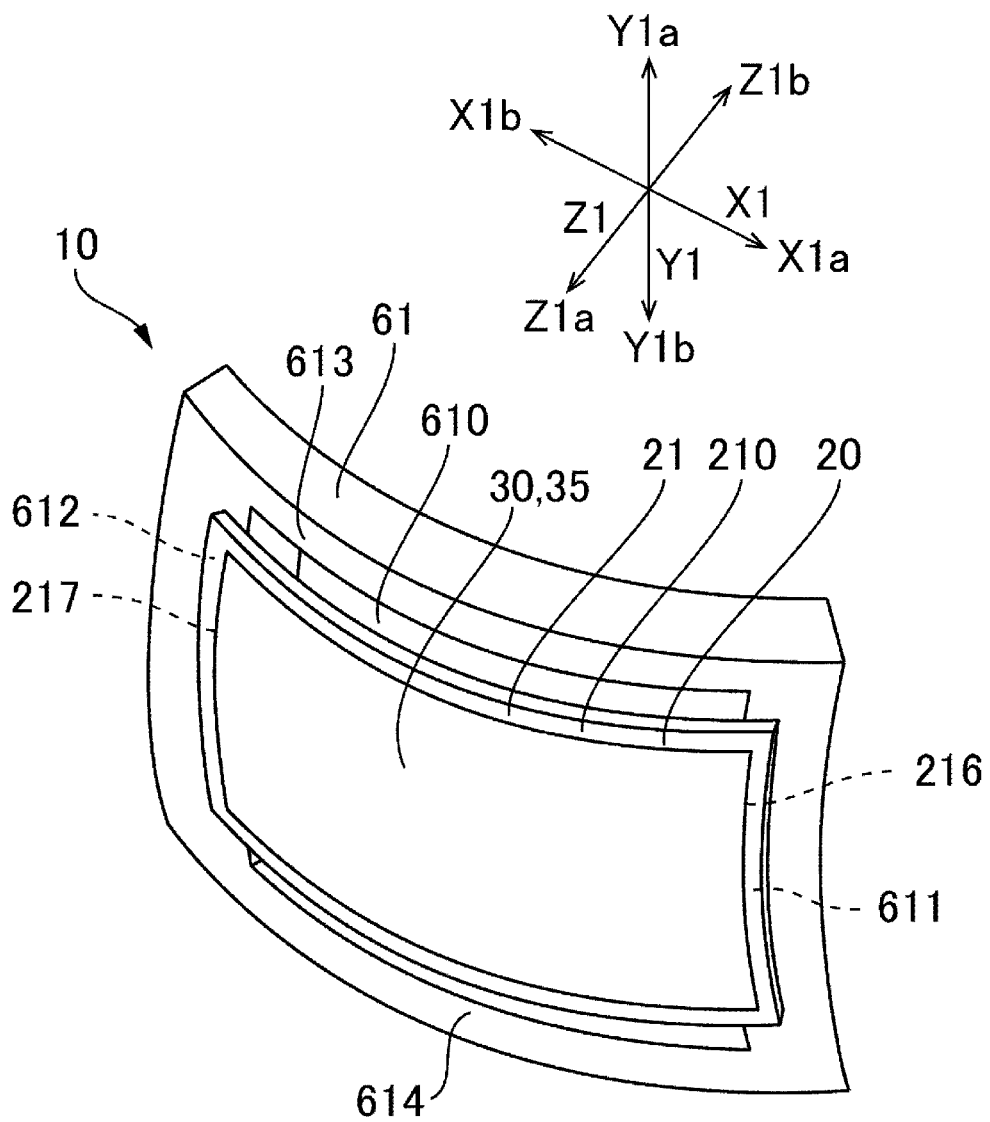
FIG. 3 is a perspective view of a deflector according to Exemplary Embodiment 1 of the disclosure.
Figure 4:
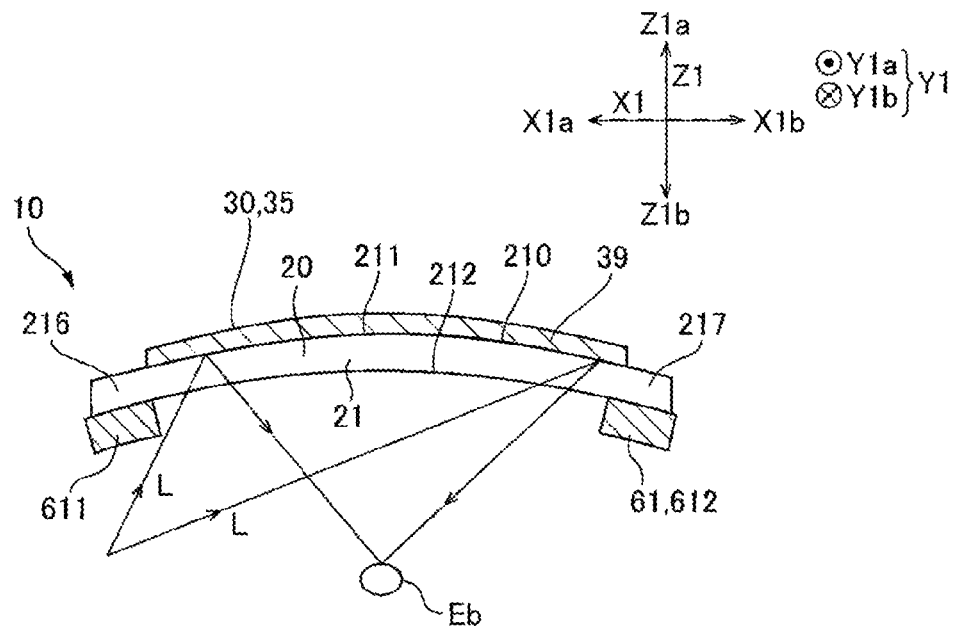
FIG. 4 is a transverse sectional view of the deflector illustrated in FIG. 3.

FIG. 3 is a perspective view of the deflector 10 according to Exemplary Embodiment 1 of the disclosure, and FIG. 4 is a transverse sectional view of the deflector 10 illustrated in FIG. 3. As illustrated in FIG. 3 and FIG. 4, the deflector 10 of Exemplary Embodiment 1 includes the support substrate 20 that is light transmissive, the holographic element 30 that is laminated on the support substrate 20, and the holder 61 that holds the support substrate 20.

The support substrate 20 includes a curved portion 21 that is curved along the first direction X1 intersecting the thickness direction Z1, and the curved portion 21 includes a convex curved surface 210 convex to the one side Z1*a* in the thickness direction Z1. The holographic element 30 is laminated on a face (one side face 211) of the curved portion 21 on the one side Z1*a* in the thickness direction Z1 or on a face (other side face 212) on the other side Z1*b*, and the holographic element 30 also deflects, in the first direction X1, light L incident toward the curved portion 21 from the other side Z1*b* in the thickness direction Z1, outputting the light L. In Exemplary Embodiment 1, the holographic element 30 is laminated on the one side face 211 made up of the convex curved surface 210. Thus, the holographic element 30 is curved so that the convex curved surface is located on the one side Z1*a* in the thickness direction Z1.

In Exemplary Embodiment 1, the curved portion 21 is also curved along the second direction Y1 intersecting both the thickness direction Z1 and the first direction X1. The holographic element 30 also deflects, in the second direction Y1, the light L incident toward the curved portion 21 from the other side Z1*b* in the thickness direction Z1, outputting the light L.

In each of the support substrate 20 and the holographic element 30, a size in the first direction X1 is larger than a size in the second direction Y1. In the holographic element 30, a deflection angle range (diffraction angle range) in the first direction X1 is wider than a deflection angle range (diffraction angle range) in the second direction Y1. Thus it is easier for the holographic element 30 to be deformed in a direction along the first direction X1 than in a direction along the second direction Y1, and deformation, when occurring, has more impact on deflection direction (diffraction direction) in the first direction X1 than in the second direction Y1. Accordingly, in light of that situation, the holder 61 in Exemplary Embodiment 1 is configured as follows.

The holder 61 includes a first fixing portion 611 that supports a part of the support substrate 20 on the one side X1*a* in the first direction X1 and a second fixing portion 612 that supports a part of the support substrate 20 on the other site X1*b* in the first direction X1. The holder 61 also includes a first coupling portion 613 that couples one end of the first fixing portion 611 and one end of the second fixing portion 612 on the one side Y1*a* in the second direction Y1 and a second coupling portion 614 that couples the other end of the first fixing portion 611 and the other end of the second fixing portion 612 on the other side 1*b* in the second direction Y1. Accordingly, the holder 61 includes an opening 610 surrounded by the first fixing portion 611, the second fixing portion 612, the first coupling portion 613, and the second coupling portion 614.

The first fixing portion 611 overlaps with a first supported portion 216 that is a part of the curved portion 21 of the support substrate 20 on the one side X1*a* in the first direction X1 from the other side Z1*b* in the thickness direction Z1, and is fixed to the first supported portion 216 by, for example, adhesive bonding. The second fixing portion 612 overlaps with a second supported portion 217 that is a part of the curved portion 21 of the support substrate 20 on the other side X1*b* in the first direction X1 from the other side Z1*b* in the thickness direction Z1, and is fixed to the second supported portion 217 by, for example, adhesive bonding. Accordingly, the support substrate 20 is continuously curved between the first supported portion 216 and the second supported portion 217 (between the first fixing portion 611 and the second fixing portion 612), and thus includes no bent portion.

In Exemplary Embodiment 1, the support substrate 20 in the first direction X1 as a whole forms the curved portion 21. Accordingly, the first supported portion 216 is an end portion of the curved portion 21 on the one side X1*a* in the first direction X1, and the second supported portion 217 is an end portion of the curved portion 21 on the other side X1*b* in the first direction X1. The first supported portion 216 and the second supported portion 217 each form a part of the curved portion 21 as a whole, thus having a curved shape or a slanted shape as a whole. Accordingly, the first fixing portion 611 and the second fixing portion 612 each have a curved shape or a slanted shape as a whole, as with the first supported portion 216 and the second supported portion 217.

The first coupling portion 613 extends in the first direction X1 at a position apart from the support substrate 20 on the one side Y1*a* in the second direction Y1, and the second coupling portion 614 extends in the first direction X1 at a position apart from the support substrate 20 on the other side Y1*b* in the second direction Y1. The first coupling portion 613 and the second coupling portion 614 may have a linear shape extending in the first direction X1, while in Exemplary Embodiment 1, the first coupling portion 613 and the second coupling portion 614 are each curved along the first direction X1 to conform to the curved portion 21 of the support substrate 20.

The support substrate 20 is formed from a plastic material, such as polymethyl methacrylate (PMMA) resin, polycarbonate (PC) resin, polyethylene terephthalate (PET) resin, and polyamide (PA) resin, and has a thickness of 500 μm to 5000 μm. The holder 61 is formed from a metal such as titanium, stainless steel, and aluminum, or a plastic material in which fillers such as silica are embedded. Consequently, the support substrate 20 and the holder 61 differ in thermal expansion coefficient. Furthermore, the support substrate 20 and the holder 61 differ in elastic modulus. For example the thermal expansion coefficient of the support substrate 20 is 60 ppm/° C. to 80 ppm/° C. while the thermal expansion coefficient of the holder 61 is 30 ppm/° C. or less, and thus the thermal expansion coefficient of the holder 61 is lower than the thermal expansion coefficient of the support substrate 20. And, for example, the elastic modulus of the support substrate 20 is 350 kg/mm$^2$ or less while the elastic modulus of the holder 61 is 1000 kg/mm$^2$ or more, and thus the elastic modulus of the holder 61 is higher than the elastic modulus of the support substrate 20.

Figure 18:
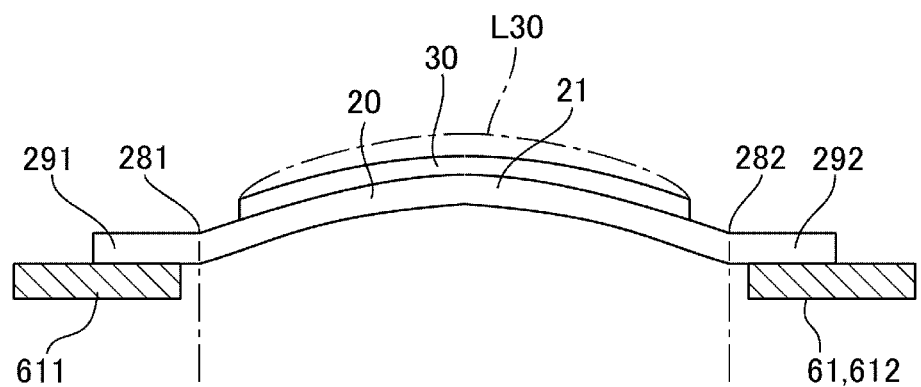
FIG. 18 is a transverse sectional view of a deflector included in a display device according to a reference example.
Figure 19:
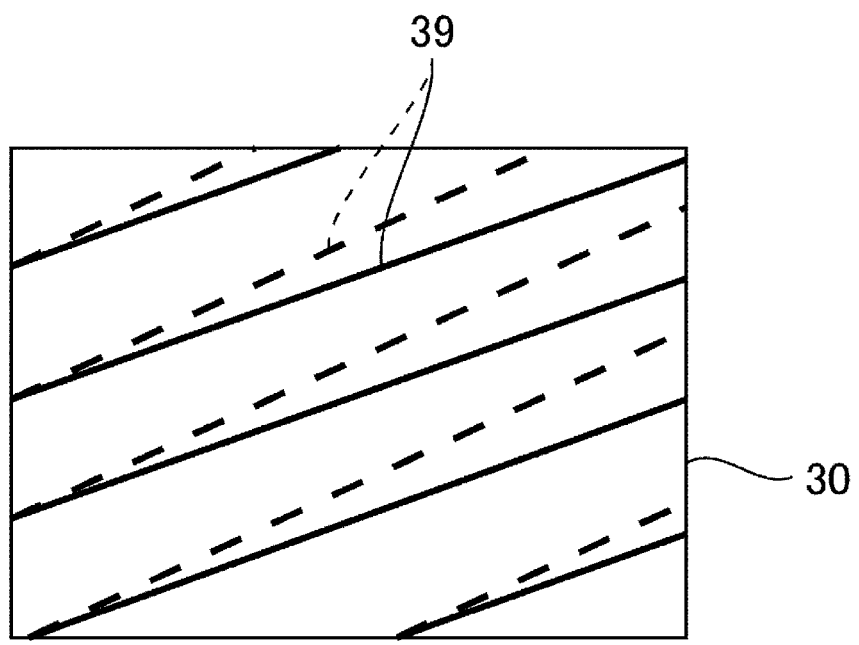
FIG. 19 illustrates an issue in the reference example.

The holographic element 30 is formed from a layer obtained in such a manner that a holographic material in which photosensitive monomers such as acrylic polymers are dispersed in a binder resin such as urethane resin, epoxy resin and cellulose resin, is applied to the support substrate 20, and is then subjected to interference exposure, and thus interference fringes 39 illustrated in FIG. 18 are recorder as changes, such as changes in refractive index, changes in transmittance, and changes in shapes such as irregular patterns, in the holographic element 30. Accordingly, light incident toward the curved portion 21 is diffracted to be deflected to the direction at an angle corresponding to an extending direction or a pitch of interference fringes or in the first direction X1 and the second direction Y1, and then is output. The holographic element 30 has a thickness of 5 μm to 25 μm and an elastic modulus of 350 kg/mm$^2$ or less. The elastic modulus of the holographic element 30 is lower than the elastic modulus of the support substrate 20. Thus, when the support substrate 20 is deformed, the holographic element 30 is deformed following the deformation of the support substrate 20.

In this respect, in Exemplary Embodiment 1 as described with reference to FIG. 3 and FIG. 4, the first fixing portion 611 and the second fixing portion 612 of the holder 61 overlap with the first supported portion 216 and the second supported portion 217 in the thickness direction Z1 and are fixed to the first supported portion 216 and the second supported portion 217, respectively, the first supported portion 216 and the second supported portion 217 being spaced apart from each other in the first direction X1 in the curved portion 21 of the support substrate 20, Accordingly, the support substrate 20 includes no bent portion between the first fixing portion 611 and the second fixing portion 612 of the holder 61 (between the first supported portion 216 and the second supported portion 217 of the support substrate 20). Therefore, even when expansion or contraction occurs in the support substrate 20 due to a change in environmental temperature, the deformation of the support substrate 20 in the first direction X1 is suppressed by the holder 61. As a result, the deformation of the holographic element 30 in the first direction X1 is suppressed, thus making it hard to cause an incident such that the diffraction angle of the holographic element 30 in the first direction X1 changes.

In particular, the holder 61 in Exemplary Embodiment 1 has a lower thermal expansion coefficient than the support substrate 20. Therefore, even when expansion or contraction occurs in the support substrate 20 due to a change in environmental temperature, the deformation of the support substrate 20 is effectively suppressed by the holder 61.

Furthermore, the holder 61 has a higher elastic modulus than the support substrate 20. Therefore, even when expansion or contraction occurs in the support substrate 20 due to a change in environmental temperature, the deformation of the support substrate 20 is effectively suppressed by the holder 61.

Method of Manufacturing Deflector 10

Figure 5:
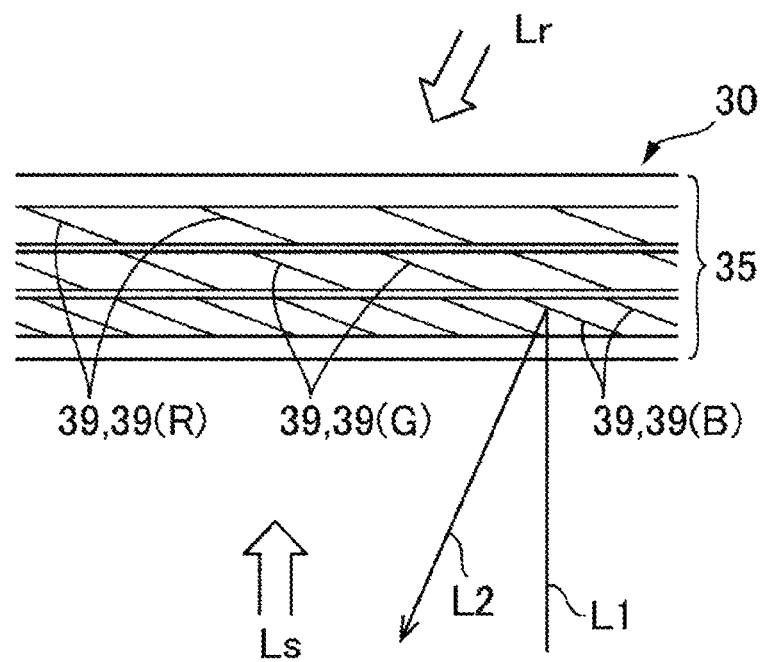
FIG. 5 illustrates a holographic element included in the deflector illustrated in FIG. 3.
Figure 6:
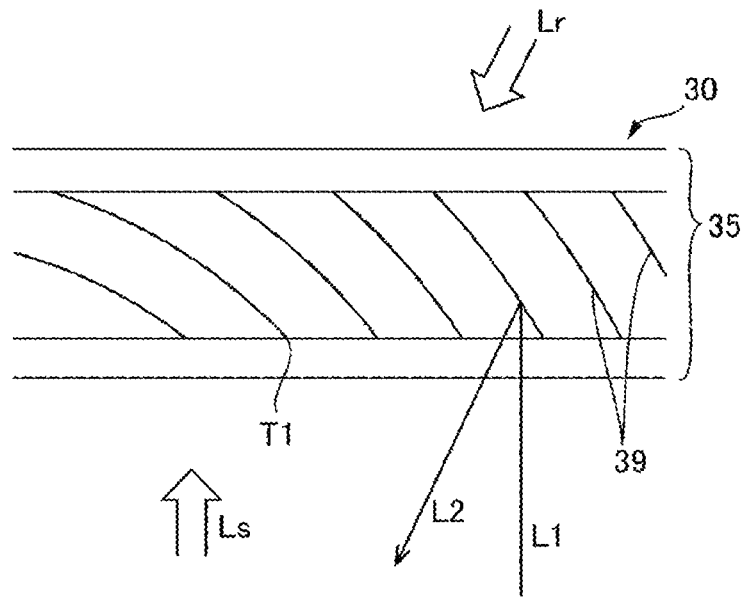
FIG. 6 illustrates a holographic element for a spherical wave.

FIG. 5 illustrates the holographic element 30 included in the deflector 10 illustrated in FIG. 3. FIG. 6 illustrates the holographic element 30 for a spherical wave.

In Exemplary Embodiment 1, as illustrated in FIG. 3 and FIG. 4, in manufacturing the deflector 10, a holographic material layer 35 in which the holographic element 30 is formed is laminated on the support substrate 20, a resulting support substrate 20 is fixed to the holder 61, the holographic material layer 35 is subjected to interference exposure accordingly, and then heated. As a result, the photosensitive monomers are cured while forming the interference fringes 39, and such a state is fixed by the binder resin.

In a process of interference exposure, as illustrated in FIG. 5, the holographic material layer 35 is subjected to interference exposure with a reference beam Lr and an object beam Ls, and thus the interference fringes 39 as illustrated in FIG. 18 are formed. In the case where the object beam Ls is a plane wave, a plurality of linear interference fringes are formed so that they are aligned in parallel. In Exemplary Embodiment 1, red light (R), green light (G), and blue light (B) enter the holographic element 30, and the holographic element 30 diffracts and outputs the beams of color light in a certain direction. Thus, first interference fringes 39 (R) having pitches each corresponding to the wavelength of the red light (R), second interference fringes 39 (G) having pitches each corresponding to the wavelength of the green light (G), and third interference fringes 39 (B) having pitches each corresponding to the wavelength of the blue light (B) are laminated in the thickness direction. The pitch corresponding to the wavelength of the red light (R) is longer than the pitch corresponding to the wavelength of the green light (G) and the pitch corresponding to the wavelength of the blue light (B), and the pitch corresponding to the wavelength of the green light (G) is longer than the pitch corresponding to the wavelength of the blue light (B). The interference fringes 39 (first interference fringes 39 (R), second interference fringes 39 (G), third interference fringes 39 (B)) are each recorded as changes such as changes in refractive index, changes in transmittance, and changes in shapes such as irregular patterns, in the holographic material layer 35. The interference fringes 39 are inclined to an incident surface of the holographic element 30 in one direction. For example, when a light beam L1 that is a spherical wave with single wavelength enters the holographic element 30 in the normal direction, a light beam L2 that is a spherical wave with the highest diffraction efficiency in one direction is output from the holographic element 30.

FIG. 5 illustrates a state where the first interference fringes 39 (R), the second interference fringes 39 (G), and the third interference fringes 39 (B) are each formed in a different layer so that the first interference fringes 39 (R), the second interference fringes 39 (G), and the third interference fringes 39 (B) are clearly seen. However, two or more types of interference fringes may be formed in a single layer, which is subjected to simultaneous interference exposure with light including light beams of two or more colors.

Furthermore, in the case where the light entering the holographic element 30 is a spherical wave, a spherical wave is used as the object beam Ls for interference exposure, for example. As a result, as schematically illustrated in FIG. 6, a plurality of curved interference fringes are formed so that they are aligned in parallel. For example, when the light beam L1 that is a spherical wave with single wavelength enters the holographic element 30 in the normal direction, the light beam L2 that is a spherical wave with the highest diffraction efficiency in one direction is output from the holographic element 30.

According to the manufacturing method, during the process of interference exposure or related processes, expansion or contraction occurs in the holographic material layer 35, which causes the support substrate 20 to warp. When the support substrate 20 warps, the interference fringes 39 shift from the positions represented by the dotted lines to the positions represented by the solid lines as described with reference to FIG. 18. In this respect, in Exemplary Embodiment 1, the first fixing portion 611 and the second fixing portion 612 of the holder 61 overlap with the first supported portion 216 and the second supported portion 217 in the thickness direction Z1 and are fixed to the first supported portion 216 and the second supported portion 217, respectively, the first supported portion 216 and the second supported portion 217 being spaced apart from each other in the first direction X1 in the curved portion 21 of the support substrate 20. Accordingly, the support substrate 20 includes no bent portion between the first fixing portion 611 and the second fixing portion 612 of the holder 61 (between the first supported portion 216 and the second supported portion 217 of the support substrate 20). Therefore, even when expansion or contraction occurs in the holographic material layer 35, the deformation of the support substrate 20 in the first direction X1 is suppressed by the holder 61, thus making it hard for the holographic material layer 35 to expand or contract. As a result, it is hard for the interference fringes 39 of the holographic element 30 to be deformed in the first direction X1, thus making it hard to cause an incident such that the diffraction angle in the first direction X1 changes.

In particular, the holder 61 in Exemplary Embodiment 1 has a higher elastic modulus than the support substrate 20. Accordingly, the deformation of the support substrate 20 in the first direction X1 is effectively suppressed by the holder 61, and it is hard for the interference fringes 39 of the holographic element 30 to be deformed in the first direction X1, thus making it hard to cause an incident such that the diffraction angle in the first direction X1 changes.

Exemplary Embodiment 2

Figure 7:
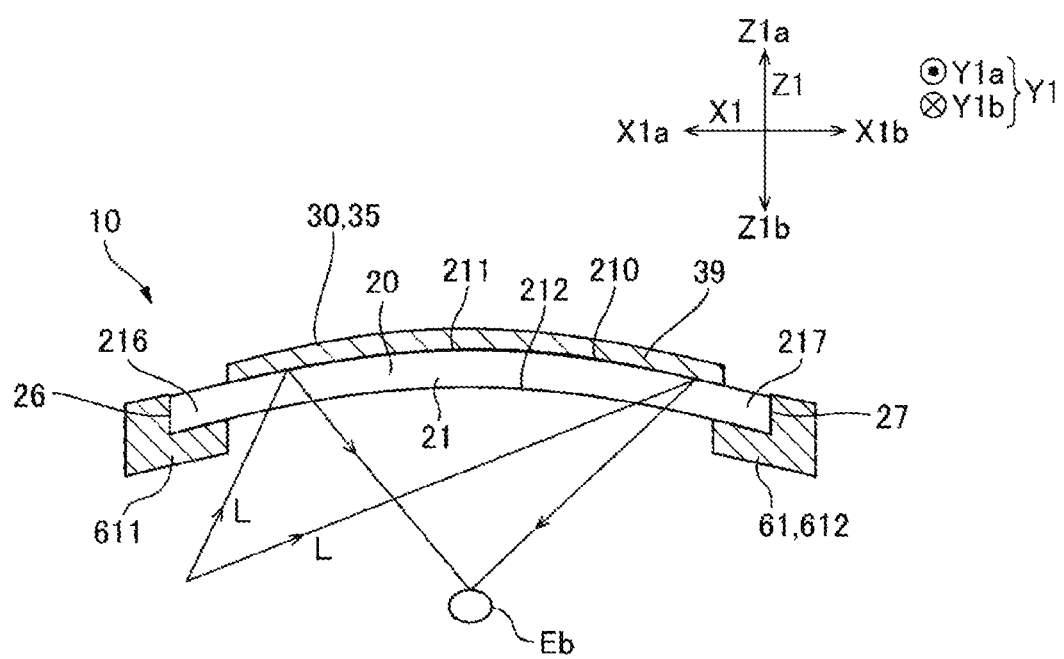
FIG. 7 is a transverse sectional view of a deflector according to Exemplary Embodiment 2 of the disclosure.

FIG. 7 is a transverse sectional view of a deflector 10 according to Exemplary Embodiment 2 of the disclosure. The basic configuration of Exemplary Embodiment 2 and the other exemplary embodiments describe later is identical to that of Exemplary Embodiment 1, and thus like reference characters refer to similar elements, and their description will not be repeated.

In Exemplary Embodiment 1, the first fixing portion 611 and the second fixing portion 612 of the holder 61 support only the other side face 212 of the curved portion 21 of the support substrate 20. In contrast, in Exemplary Embodiment 2, as illustrated in FIG. 7, the first fixing portion 611 is bent to overlap with a first side face 26 that is a side face of the support substrate 20 on the one side X1a in the first direction X1, and is fixed to the first side face 26 by, for example, adhesive bonding. The second fixing portion 612 is bent to overlap with a second side face 27 that is a side face of the support substrate 20 on the other side X1b in the first direction X1, and is fixed to the second side face 27 by, for example, adhesive bonding. The other configuration is identical to that of Exemplary Embodiment 1.

In such structure, both side faces of the support substrate 20 in the first direction X1 (the first side face 26 and the second side face 27) are fixed by the holder 61. Therefore, the deformation of the support substrate 20 in the first direction X1, such as expansion and contraction, is effectively suppressed by the holder 61. As a result, the deformation of the holographic element 30 in the first direction X1 is effectively suppressed.

Exemplary Embodiment 3

Figure 8:
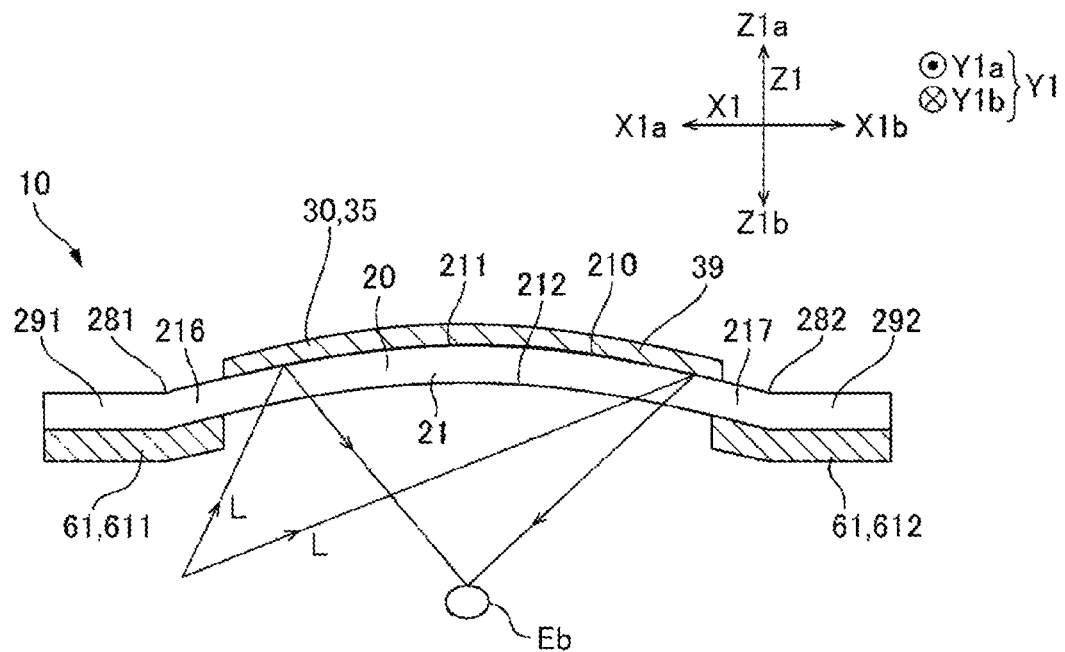
FIG. 8 is a transverse sectional view of a deflector according to Exemplary Embodiment 3 of the disclosure.

FIG. 8 is a transverse sectional view of a deflector 10 according to Exemplary Embodiment 3 of the disclosure. In Exemplary Embodiment 1 and Exemplary Embodiment 2, the support substrate 20 in the first direction X1 as a whole forms the curved portion 21. In contrast, Exemplary Embodiment 3, as illustrated in FIG. 8, the support substrate 20 includes a first flat portion 291 that is coupled to the curved portion 21 on the one side X1a in the first direction X1 through a first bent portion 281. The support substrate 20 also includes a second flat portion 292 that is coupled to the curved portion 21 on the other side X1b in the first direction X1 through a second bent portion 282.

Accordingly, the first fixing portion 611 of the holder 61 is bent at a position corresponding to the first bent portion 281 of the support substrate 20, overlaps with the first supported portion 216, which is an end portion of the curved portion 21, and the first flat portion 291 in the thickness direction Z1, and is fixed to the first supported portion 216 and the first flat portion 291. The second fixing portion 612 of the holder 61 is bent at a position corresponding to the second bent portion 282 of the support substrate 20, overlaps with the second supported portion 217, which is an end portion of the curved portion 21, and the second portion 292 in the thickness direction Z1, and is fixed to the second supported portion 217 and the second flat portion 292. The other configuration is identical to that of Exemplary Embodiment 1.

In such structure, it is easy to secure an overlapping part between the first fixing portion 611 and the first flat portion 291 of the support substrate 20 with a screw in addition to adhesive bonding. Furthermore, it is easy to secure an overlapping part between the second fixing portion 612 and the second flat portion 292 of the support substrate 20 with a screw in addition to adhesive bonding. In Exemplary Embodiment 3, the support substrate 20 includes the first flat portion 291 and the second flat portion 292, while the support substrate 20 includes no bent portion between the first fixing portion 611 and the second fixing portion 612 of the holder 61 (between the first supported portion 216 and the second supported portion 217 of the support substrate 20). Therefore, even when expansion or contraction occurs in the support substrate 20, the deformation of the support substrate 20 in the first direction X1 is suppressed by the holder 61. As a result, Exemplary Embodiment 3 has the same advantageous effect as Exemplary Embodiment 1, including the deformation of the holographic element 30 in the first direction X1 being suppressed.

Exemplary Embodiment 4

Figure 9:
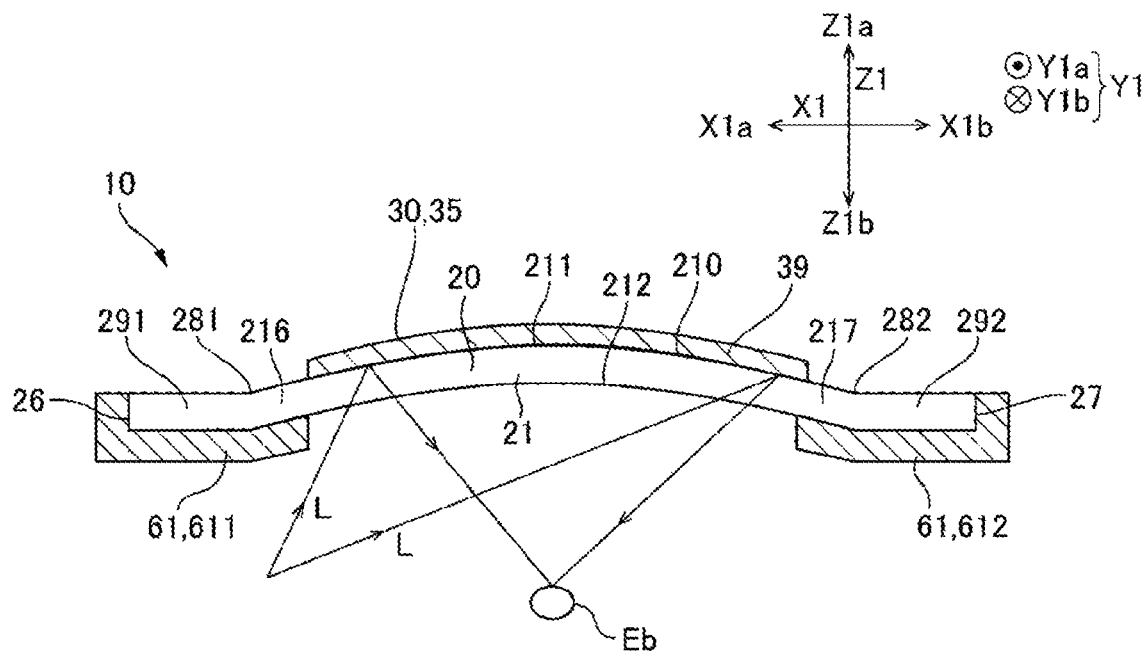
FIG. 9 is a transverse sectional view of a deflector according to Exemplary Embodiment 4 of the disclosure.

FIG. 9 is a transverse sectional view of a deflector 10 according to Exemplary Embodiment 4 of the disclosure. In Exemplary Embodiment 3, the first fixing portion 611 and the second fixing portion 612 of the holder 61 support only the face of the support substrate 20 on the other side Z1b in the thickness direction 11. In contrast, in Exemplary Embodiment 4, as illustrated in FIG. 9, the first fixing portion 611 is bent to overlap with the first side face 26 that is a side face of the support substrate 20 on the one side X1a in the first direction X1, and is fixed to the first side face 26 by, for example, adhesive bonding. The second fixing portion 612 is bent to overlap with the second side face 27 that is a side face of the support substrate 20 on the other side X1b in the first direction X1, and is fixed to the second side face 27 by, for example, adhesive bonding. The other configuration is identical to that of Exemplary Embodiment 1.

In such structure, both side faces of the support substrate 20 in the first direction X1 (the first side face 26 and the second side face 27) are fixed by the holder 61, Therefore, the deformation of the support substrate 20 in the first direction X1, such as expansion and contraction, is effectively suppressed by the holder 61. As a result, the deformation of the holographic element 30 in the first direction X1 is effectively suppressed.

Exemplary Embodiment 5

Figure 10:
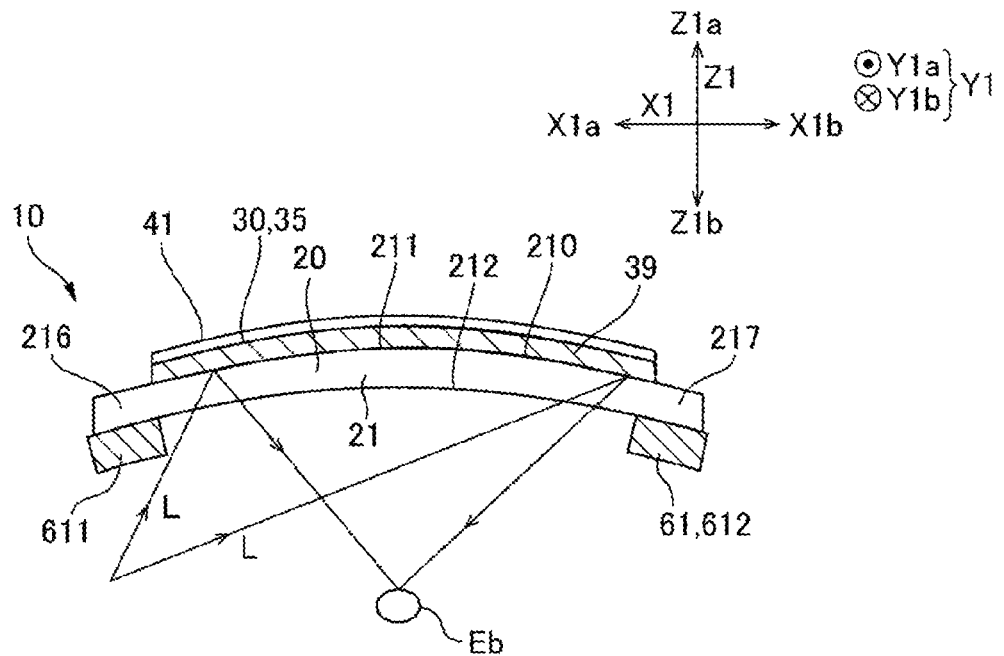
FIG. 10 is a transverse sectional view of a deflector according to Exemplary Embodiment 5 of the disclosure.

FIG. 10 is a transverse sectional view of a deflector 10 according to Exemplary Embodiment 5 of the disclosure. In Exemplary Embodiment 1 and the others, the holographic element 20 is exposed on an opposite side to the support substrate 20. In contrast, in Exemplary Embodiment 5, as illustrated in FIG. 10, a light transmissive support film 41 is laminated on the holographic element 30 on the opposite side to the support substrate 20 in a region that overlaps with the curved portion 21 of the support substrate 20 in the thickness direction Z1. The support film 41 has the same size as the holographic element 30. The support film 41 is a film formed from, for example, polymethyl methacrylate (PMMA) resin, polycarbonate (PC) resin, polyethylene terephthalate (PET) resin, or polyamide (PA) resin, as with the support substrate 20. The support film 41 has a thickness of 50 μm to 3000 μm, and also has a thermal expansion coefficient and an elastic modulus which are approximately the same as those of the support substrate 20. The other configuration is identical to that of Exemplary Embodiment 1.

In this structure, as in Exemplary Embodiment 1, the support substrate 20 includes no bent portion between the first fixing portion 611 and the second fixing portion 612 of the holder 61 (between the first supported portion 216 and the second supported portion 217 of the support substrate 20). Therefore, even when expansion or contraction occurs in the support substrate 20, the deformation of the support substrate 20 is suppressed by the holder 61. As a result, Exemplary Embodiment 5 has the same advantageous effect as Exemplary Embodiment 1, including the deformation of the holographic element 30 and a cover substrate 40 in the first direction X1 being suppressed. The structure using the cover substrate 40 of Exemplary Embodiment 5 may apply to not only Exemplary Embodiment 1 but also Exemplary Embodiment 2 to Exemplary Embodiment 4.

Exemplary Embodiment 6

Figure 11:
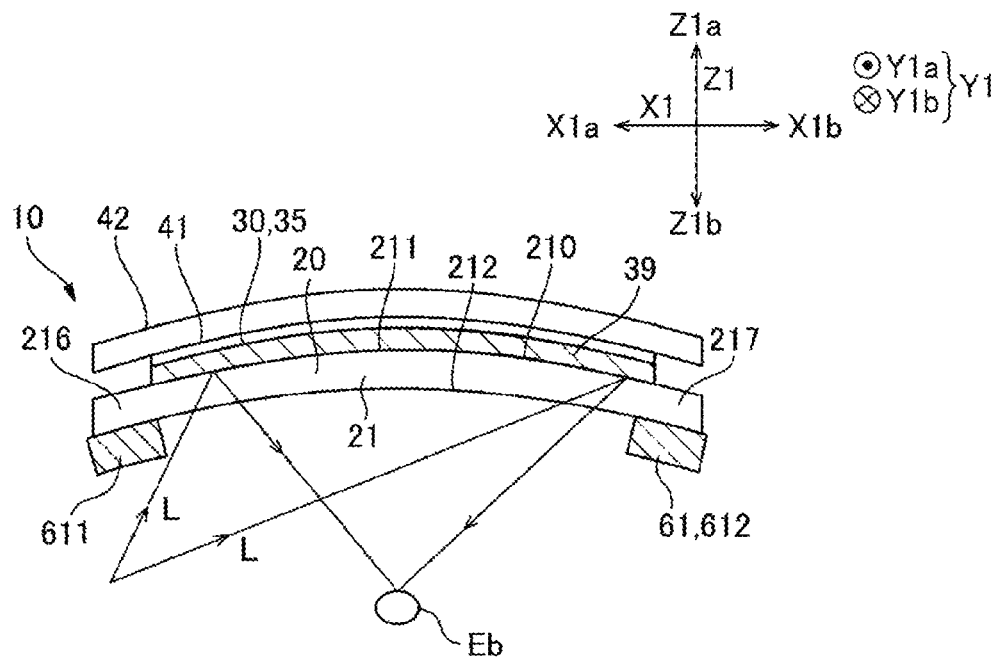
FIG. 11 is a transverse sectional view or a deflector according to Exemplary Embodiment 6 of the disclosure.

FIG. 11 is a transverse sectional view of a deflector 10 according to Exemplary Embodiment 6 of the disclosure. In Exemplary Embodiment 6, as illustrated in FIG. 11, a light transmissive support film 41 is laminated on the holographic element 30, on the opposite side to the support substrate 20 in a region that overlaps with the curved portion 21 of the support substrate 20 in the thickness direction Z1, as in Exemplary Embodiment 5. Furthermore, in Exemplary Embodiment 6, a cover substrate 42 that is light transmissive is laminated on the support film. 41, on the opposite side to the holographic element 30 in a region that overlaps with the curved portion 21 of the support substrate 20 in the thickness direction Z1. The cover substrate 42 is larger than the holographic element 30 and has the same size as a portion of the support substrate 20 that supports the holographic element 30. The cover substrate 42 is a substrate formed from, for example, polymethyl methacrylate (PMMA) resin, polycarbonate (PC) resin, polyethylene terephthalate (PET) resin, or polyamide (PA) resin, as with the support substrate 20. The cover substrate 42 is formed from a plastic material, such as polymethyl methacrylate (PMMA) resin, polycarbonate (PC) resin, polyethylene terephthalate (PET) resin, and polyamide (PA) resin, as with the support substrate 20, and has a thickness of 50 μm to 5000 μm. The cover substrate 42 has a thermal expansion coefficient and an elastic modulus which are approximately the same as those of the support substrate 20. The other configuration is identical to that of Exemplary Embodiment 1. The structure using the cover substrate 42 of Exemplary Embodiment 6 may apply to not only Exemplary Embodiment 1 but also Exemplary Embodiment 2 to Exemplary Embodiment 4.

Exemplary Embodiment 7

Figure 12:
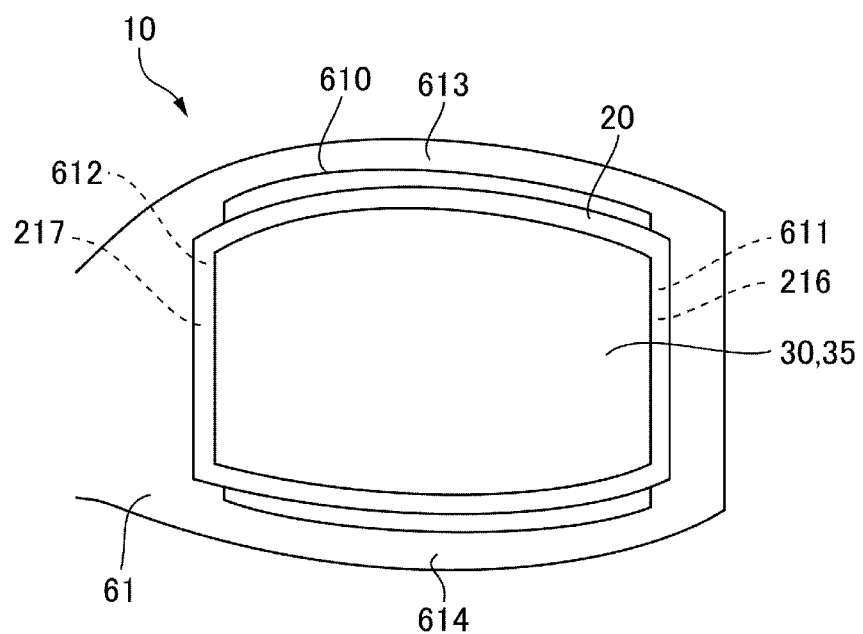
FIG. 12 is a front view of a deflector according to Exemplary Embodiment 7 of the disclosure.

FIG. 12 is a front view of a deflector 10 according to Exemplary Embodiment 7 of the disclosure. In Exemplary Embodiment 1 and the others, each of the support substrate 20 and the holographic element 30 has an equal width in the second direction Y1 at any position in the first direction X1. In contrast, in Exemplary Embodiment 7, as illustrated in FIG. 12 when viewed from the thickness direction 11, the curved portion 21 of the support substrate 20 and the holographic element 30 each have widths such that a width in the second direction Y1 in a central portion in the first direction X1 is wider than each of a width in the second direction Y1 on the one side X1a in the first direction X1 and a width in the second direction Y1 on the other side X1b in the first direction X1. Accordingly, the first coupling portion 613 and the second coupling portion 614 of the holder 61 are curved outward in the second direction Y1 and along the first direction X1. The other configuration is identical to that of Exemplary Embodiment 1, The structure using the curved portion 21 of the support substrate 20 and the shape of the holographic element 30 in Exemplary Embodiment 7 may apply to not only Exemplary Embodiment 1 but also Exemplary Embodiment 2 to Exemplary Embodiment 6.

Exemplary Embodiment 8

Figure 13:
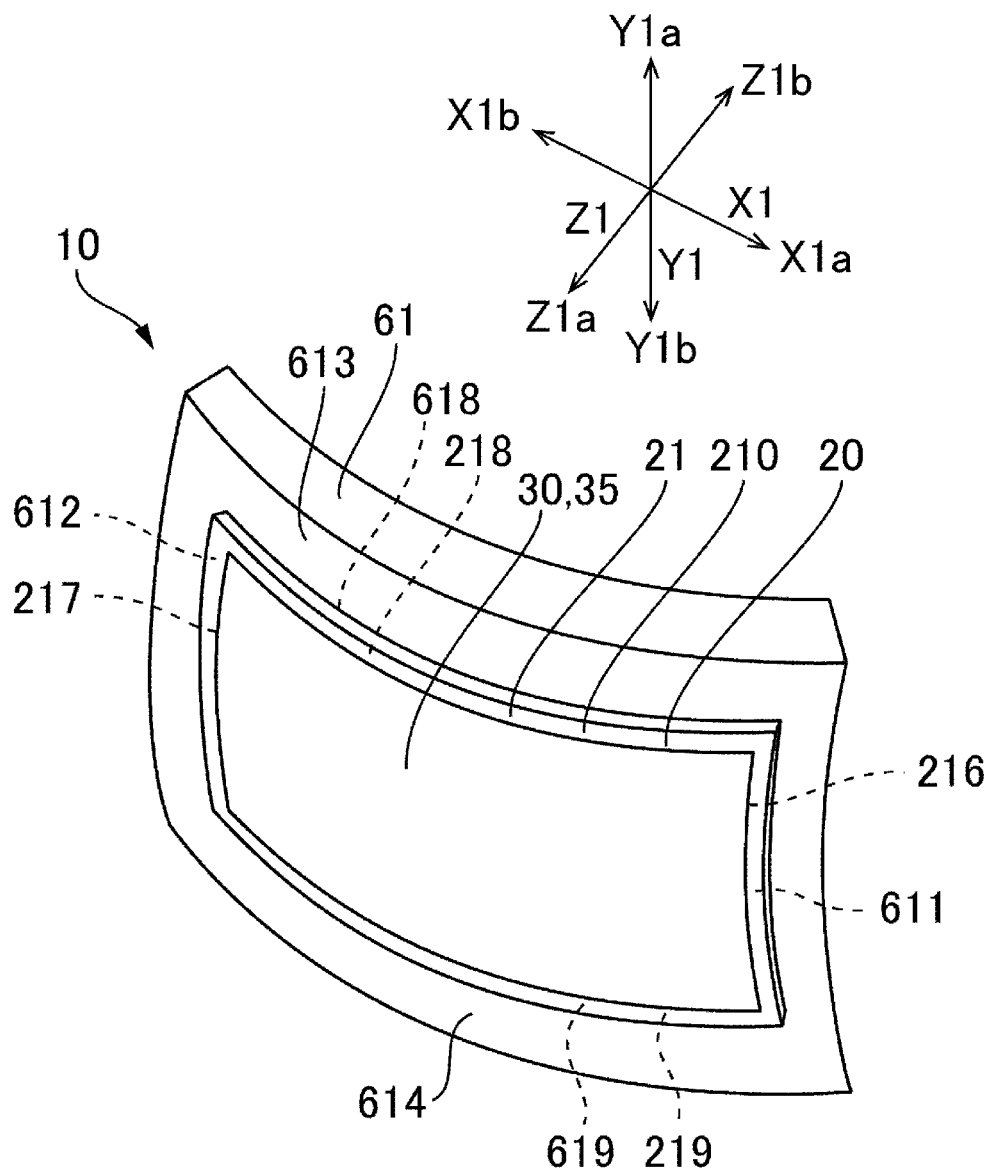
FIG. 13 is a perspective view of a deflector according to Exemplary Embodiment 8 of the disclosure.
Figure 14:
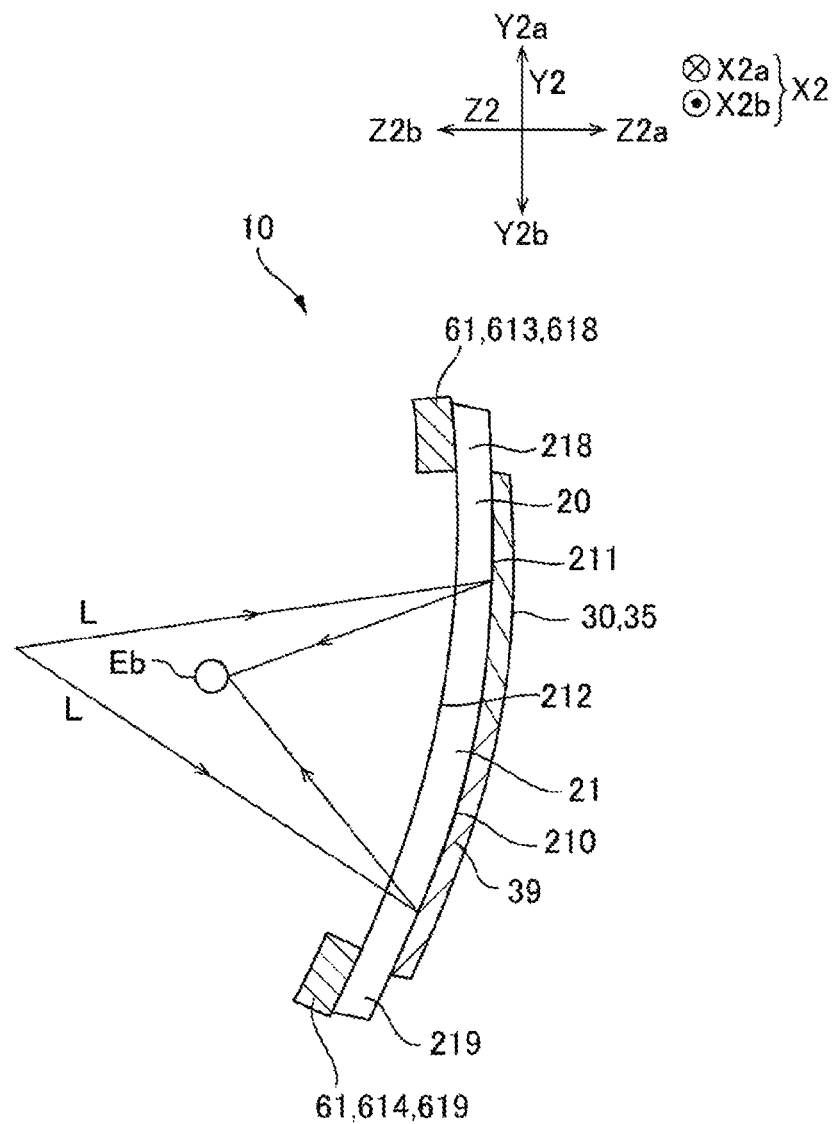
FIG. 14 is a longitudinal sectional view of the deflector illustrated in FIG. 13.

FIG. 13 is a perspective view of a deflector 10 according to Exemplary Embodiment 8 of the disclosure. FIG. 14 is a longitudinal sectional view of the deflector 10 illustrated in FIG. 13. In Exemplary Embodiment 1 to Exemplary Embodiment 5 and the others, the support substrate 20 is fixed only on both sides in the first direction X1 by the holder 61. In contrast, in Exemplary Embodiment 8, as illustrated in FIG. 13 and FIG. 14, the holder 61 includes a third fixing portion 618 that holds an end portion of the support substrate 20 on the one side Y1a in the second direction Y1 through the first coupling portion 613. The holder 61 also includes a fourth fixing portion 619 that holds an end portion of the support substrate 20 on the other side Y1b in the second direction Y1 through the second coupling portion 614. The curved portion 21 of the support substrate 20 is curved along the first direction X1 and the second direction Y1, and the holographic element 30 deflects, in the first direction X1 and the second direction Y1, the light incident toward the curved portion 21.

In the deflector 10 having such configuration, the third fixing portion 618 overlaps with a third supported portion 218 in the thickness direction Z1 and is fixed to the third supported portion 218, the third supported portion 218 being an end portion of the curved portion 21 of the support substrate 20 on the one side Y1a in the second direction Y1 The fourth fixing portion 619 overlaps with a fourth supported portion 219 in the thickness direction Z1 and is fixed to a fourth supported portion 219, the fourth supported portion 219 being an end portion of the curved portion 21 of the support substrate 20 on the other side Y1b in the second direction Y1.

Furthermore, in Exemplary Embodiment 8, the first fixing portion 611 and the second fixing portion 612 are fixed to the first supported portion 216 and the second supported portion 217 of the curved portion 21 of the support substrate 20, respectively, as in Exemplary Embodiment 1. Accordingly, the support substrate 20 includes no bent portion either between the first fixing portion 611 and the second fixing portion 612 of the holder 61 (between the first supported portion 216 and the second supported portion 217) or between the third fixing portion 618 and the fourth fixing portion 619 of the holder 61 (between the third supported portion 218 and the fourth supported portion 219). Therefore, even when expansion or contraction occurs in the support substrate 20, the deformation of the support substrate 20 in the first direction X1 and the second direction Y1 is suppressed by the holder 61. As a result, the deformation of the holographic element 30 and the cover substrate 40 in the first direction X1 and the second direction Y1 is suppressed, thus making it hard to cause an incident such that the diffraction angle of the holographic element 30 in the first direction X1 and the second direction Y1 changes.

Exemplary Embodiment 9

Figure 15:
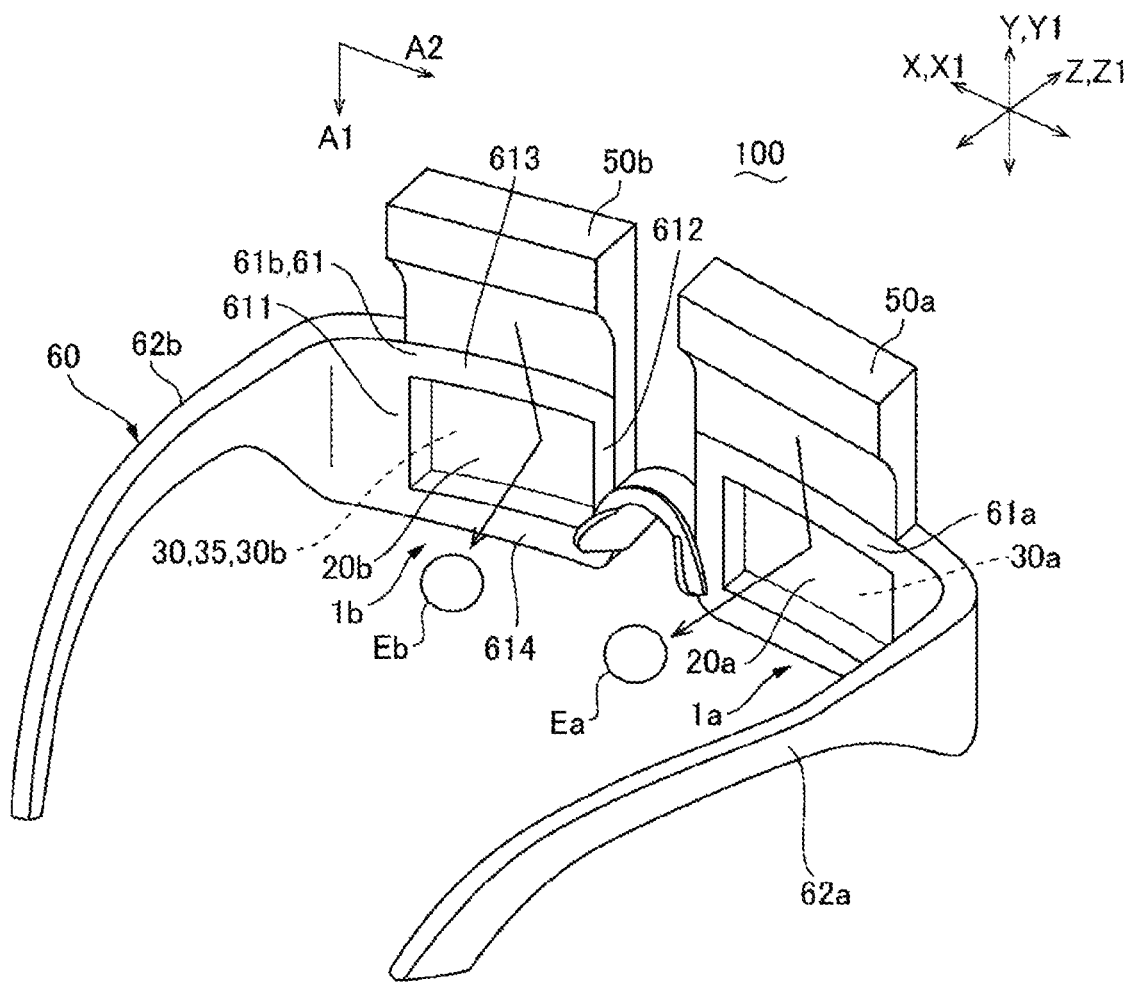
FIG. 15 illustrates an example of an appearance of a display device according to Exemplary Embodiment 9 of the disclosure.

FIG. 15 illustrates an example of an appearance of a display device 100 according to Exemplary Embodiment 9 of the disclosure. In Exemplary Embodiment 1 to Exemplary Embodiment 7, the right-eye image light projector 50a and the left-eye image light projector 50b are attached to the temple 62a and the temple 62b of the frame 60, respectively, in contrast, in Exemplary Embodiment 9, as illustrated in FIG. 15, the right-eye image light projector 50a and the left-eye image light projector 50b are attached on upper sides of the right-eye holder 61a and the left-eye holder 61b of the frame 60, respectively. In this structure, in each of the support substrate 20 and the holographic element 30, a size in the first direction X1 is larger than a size in the second direction Y1.

In the display device 100 having such configuration, as described with reference to FIG. 3 and FIG. 4, the first fixing portion 611 of the holder 61 is fixed to the end portion (first supported portion 216) of the curved portion 21 of the support substrate 20 on the one side X1a in the first direction X1. The second fixing portion 612 of the holder 61 is fixed to the end portion (second supported portion 217) of the curved portion 21 of the support substrate 20 on the other side X1b in the first direction X1. Therefore, the support substrate 20 includes no bent portion between the first fixing portion 611 and the second fixing portion 612. Therefore, even when expansion or contraction occurs in the support substrate 20, the deformation of the support substrate 20 in the first direction X1 is suppressed by the holder 61. As a result, the deformation of the holographic element 30 and the cover substrate 40 in the first direction X1 is suppressed, thus making it hard to cause an incident such that the diffraction angle of the holographic element 30 in the first direction X1 changes, as in Exemplary Embodiment 1. The other configuration is identical to that of Exemplary Embodiment 1.

Exemplary Embodiment 10

Figure 16:
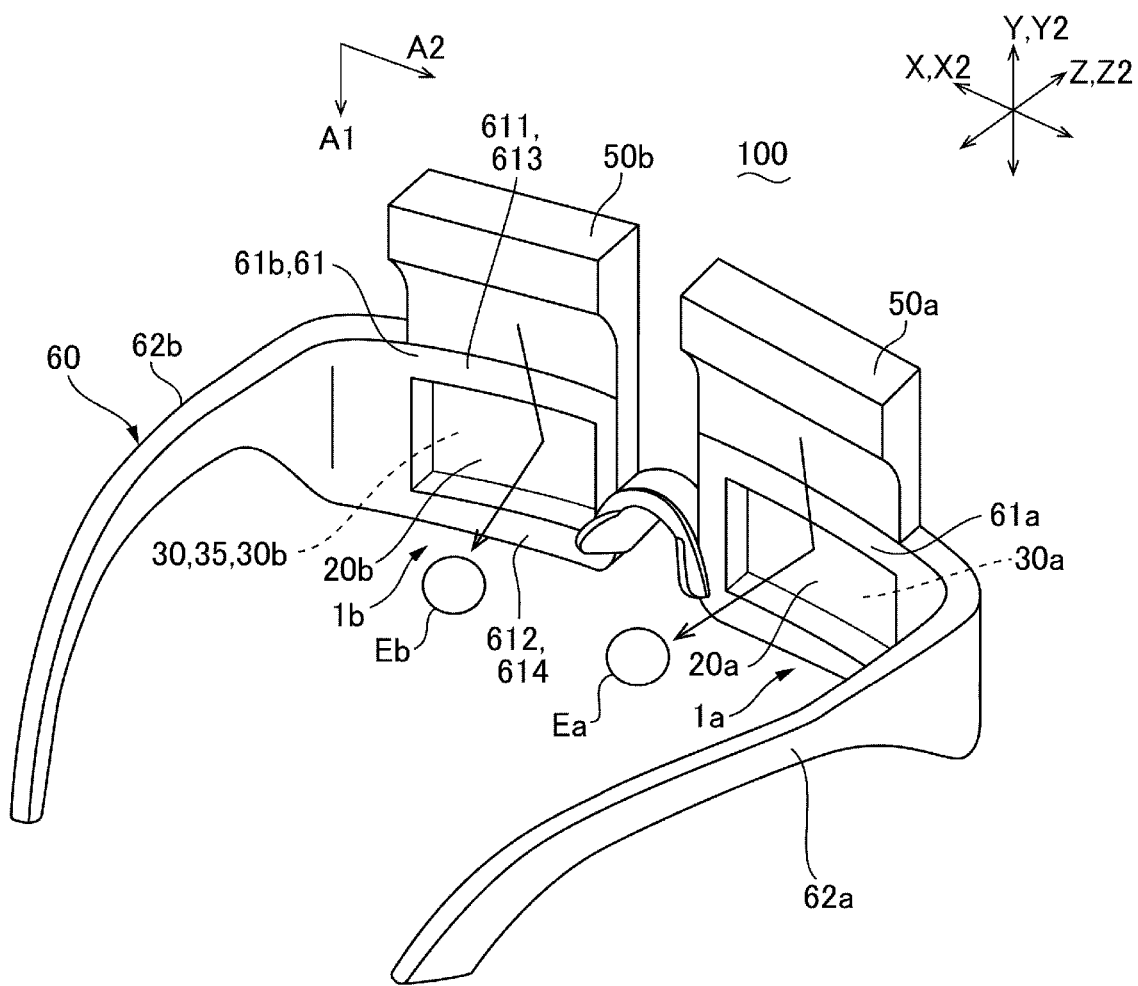
FIG. 16 illustrates an example of an appearance of a display device according to Exemplary Embodiment 10 of the disclosure.
Figure 17:
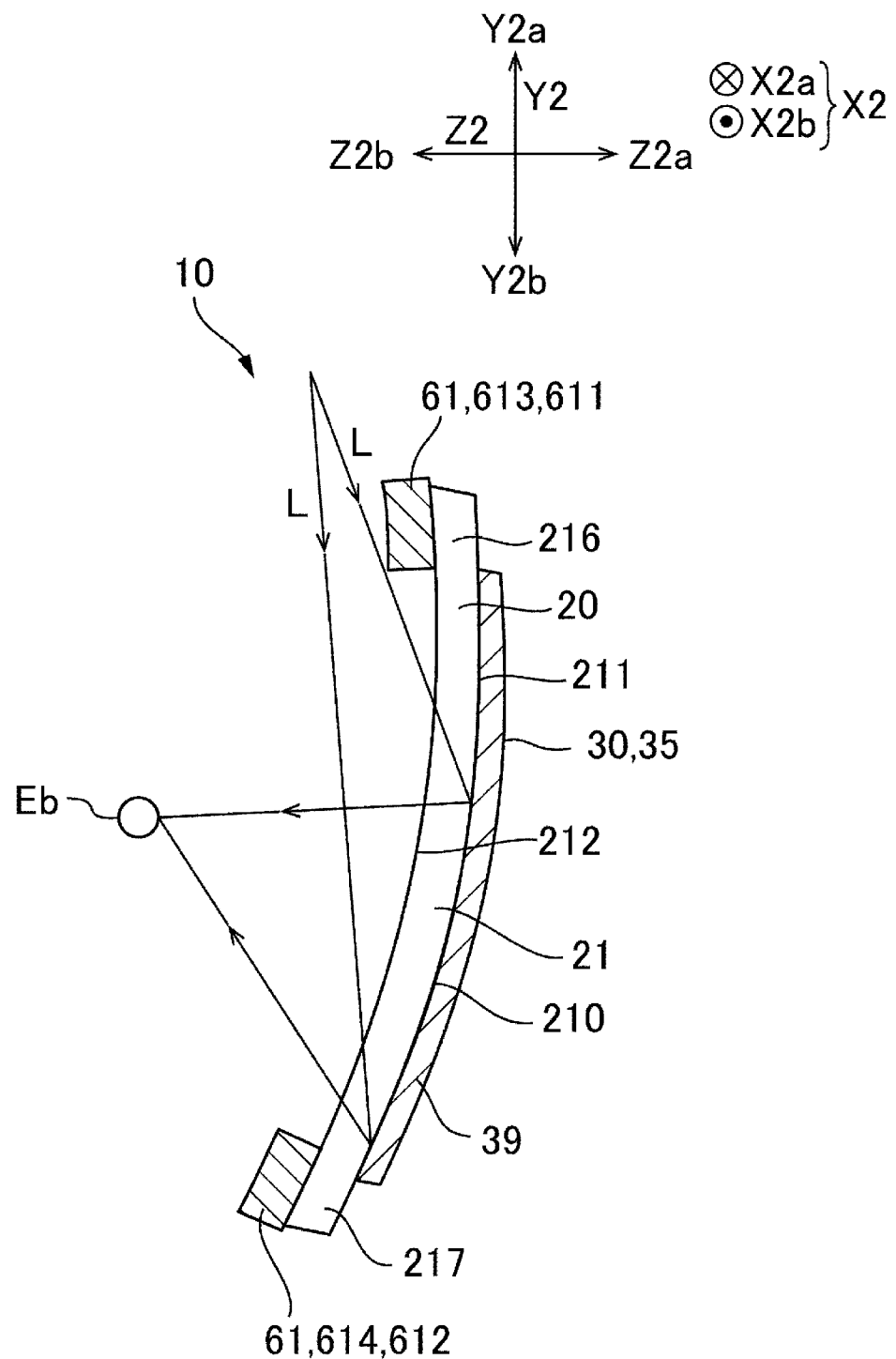
FIG. 17 is a longitudinal sectional view of a deflector included in the display device illustrated in FIG. 16.

FIG. 16 illustrates an example of an appearance of a display device 100 according to Exemplary Embodiment 10 of the disclosure. FIG. 17 is a longitudinal sectional view of a deflector 10 included in the display device 100 illustrated in FIG. 16. In Exemplary Embodiment 1 to Exemplary Embodiment 8, the first direction X1 corresponds to the X direction (left- and right direction) in FIG. 1, the second direction Y1 corresponds to the Y direction (up-and-down direction) in FIG. 1, and the third direction Z1 corresponds to the direction (front-and-rear direction) in FIG. 1. In contrast, in Exemplary Embodiment 10, as illustrated in FIG. 16 and FIG. 17, the first direction Y2 corresponds to the Y direction (up-and-down direction) in FIG. 1, the second direction X2 corresponds to the X direction (left- and right direction) in FIG. 1, and the thickness direction Z2 corresponds to the Z direction (front-and-rear direction) in FIG. 1. Accordingly, the right-eye image light projector 50a and the left-eye image light projector 50b are attached on upper sides of the right-eye holder 61a and the left-eye holder 61b of the frame 60, respectively. In this structure, in each of the support substrate 20 and the holographic element 30, a size in the second direction X2 is larger than a size in the first direction Y2.

In the deflector 10 included in the display device 100 having such configuration, as illustrated in FIG. 17, the first fixing portion 611, which is fixed to the end portion (first supported portion 216) of the curved portion 21 of the support substrate 20 on the one side Y2a in the first direction Y2, is formed the first coupling portion 613 of the holder 61. Furthermore, the second fixing portion 612, which is fixed to the end portion (second supported portion 217) of the curved portion 21 of the support substrate 20 on the other side Y2b in the first direction Y2, is formed by the second coupling portion 614 of the holder 61.

In this configuration, the support substrate 20 includes no bent portion between the first fixing portion 611 and the second fixing portion 612. Therefore, even when expansion or contraction occurs in the support substrate 20, the deformation of the support substrate 20 in the first direction Y2 is suppressed by the holder 61. As a result, the deformation of the holographic element 30 and the cover substrate 40 in the first direction Y2 is suppressed, thus making it hard to cause an incident such that the diffraction angle of the holographic element 30 in the first direction Y2 changes. The other configuration is identical to that of Exemplary Embodiment 1.

Exemplary Embodiment 11

The configuration described in Exemplary Embodiment 8 may apply to the configuration as described in Exemplary Embodiment 9 or Exemplary Embodiment 10 in which the right-eye image light projector 50a and the left-eye image light projector 50b are attached on upper sides of the right-eye holder 61a and the left-eye holder 61b of the frame 60, respectively. For example, in the configuration illustrated in FIG. 15, the first fixing portion 611 and the second fixing portion 612 overlap with the first supported portion 216 and the second supported portion 217 of the curved portion 21 of the support substrate 20 in the thickness direction Z1 and are fixed to the first supported portion 216 and the second supported portion 217, respectively. In addition, the third fixing portion formed by the first coupling portion 613 and the fourth fixing portion formed by the second coupling portion 614 overlap with the third supported portion and the fourth supported portion in the thickness direction 11 and are fixed to the third supported portion and the fourth supported portion, respectively, the third supported portion and the fourth supported portion being in the respective end portions of the curved portion 21 of the support substrate 20 in the second direction Y1.

Other Exemplary Embodiments

In the exemplary embodiments described above, the display device 100 is a head mounted type, and accordingly, the holographic element 30 of the deflector 10 deflects the incident light in the X direction and the Y direction. However, the disclosure may apply to another type of display device that may include the deflector 10 and a holographic element 30 that deflects the incident light only in one direction (first direction). Furthermore, the exemplary embodiments described above, the display device 100 is a head mounted type, and accordingly, the holographic element 30 of the deflector 10 is curved along the X direction and the Y direction. However, the disclosure may apply to a holographic element 30 that is curved along one of the direction or the Y direction (first direction). In the exemplary embodiments described above, the configuration in which the image light projector includes the light source and the scanning optical system is exemplified. However, the disclosure may apply to such a configuration that the image light projector includes a crystal liquid display or an organic electroluminescent display panel.

What is claimed is:

1. A deflector comprising:
a support substrate including a curved portion that is curved along a first direction intersecting a thickness direction, the curved portion including a convex curved surface facing to one side in the thickness direction;
a holographic element laminated on at least one of a first surface and a second surface of the curved portion in the thickness direction, and configured to deflect and output light that is incident toward the curved portion; and
a holder configured to hold the support substrate, wherein the holder includes
a first fixing portion that overlaps with a first supported portion of the curved portion in the thickness direction and that is fixed to the first supported portion, the first supported portion including a first side edge of the curved portion, and
a second fixing portion that overlaps with a second supported portion of the curved portion in the thickness direction and that is fixed to the second supported portion, the second supported portion including a second side edge opposite from the first side edge of the curved portion in the first direction, with the proviso that
the first side edge and the second side edge include entire right and left side edges of the curved portion, and
the first fixing portion and the second fixing portion include right and left side portions of the holder, the holder being made of a continuous material.

2. The deflector according to claim 1, wherein
the holder has a lower thermal expansion coefficient than the support substrate.

3. The deflector according to claim 1, wherein
the holder has a higher elastic modulus than the support substrate.

4. The deflector according to claim 1, wherein
the first fixing portion is bent to overlap with a first side face and to be fixed to the first side face, the first side face being a side face of the support substrate on a first side in the first direction, and
the second fixing portion is bent to overlap with a second side face and to be fixed to the second side face, the second side face being a side face of the support substrate on a second side in the first direction.

5. The deflector according to claim 1, wherein
the support substrate in the first direction as a whole constitutes the curved portion.

6. The deflector according to claim 1, wherein
the support substrate includes a first flat portion that is coupled to the curved portion on a first side in the first direction through a first bent portion, and
the first fixing portion overlaps with the first supported portion and the first flat portion in the thickness direction and is fixed to the first supported portion and the first flat portion.

7. The deflector according to claim 6, wherein
the support substrate includes a second flat portion that is coupled to the curved portion on a second side in the first direction through a second bent portion, and
the second fixing portion overlaps with the second supported portion and the second flat portion in the thickness direction and is fixed to the second supported portion and the second flat portion.

8. The deflector according to claim 1, wherein
the curved portion includes a central portion in the first direction, a width of the central portion in a second direction intersecting the first direction is longer than each of a width of the curved portion in the second direction on a first side in the first direction and a width of the curved portion in the second direction on a second side in the first direction, when viewed from the thickness direction.

9. The deflector according to claim 1, wherein
a supporting film is laminated on a surface of the holographic element, the surface being on a side opposite to the support substrate, in a region overlapping with the curved portion in the thickness direction.

10. The deflector according to claim 9, wherein
a cover substrate is laminated on a surface of the supporting film, the surface being on a side opposite to the holographic element, in a region overlapping with the curved portion in the thickness direction.

11. The deflector according to claim 1, wherein
the curved portion is curved along a second direction intersecting the first direction.

12. The deflector according to claim 11, wherein
the holographic element deflects the light incident toward the curved portion in the first direction and the second direction.

13. The deflector according to claim 1, wherein
the curved portion is curved along a second direction intersecting the first direction,
the holographic element deflects the light incident toward the curved portion in the first direction and the second direction,
the holder includes a third fixing portion configured to hold an end portion of the support substrate on a first side in the second direction intersecting both the first direction and the thickness direction and a fourth fixing portion configured to hold an end portion of the support substrate on a second side in the second direction,
the third fixing portion overlaps with a third supported portion in the thickness direction and is fixed to the third supported portion, the third supported portion being a part of the curved portion on the first side in the second direction, and
the fourth fixing portion overlaps with a fourth supported portion in the thickness direction and is fixed to the fourth supported portion, the fourth supported portion being a part of the curved portion on the second side in the second direction.

14. A display device comprising:
the deflector according to claim 1, wherein
the display device including an image light projector configured to project image light from a second side in the thickness direction to the curved portion and from a first side in the first direction.

15. The display device according to claim 14, further comprising:
a frame configured to hold the support substrate and be mounted on a head of a viewer to position the holographic element in front of an eye of the viewer, wherein
the holder is a part of the frame.

16. The display device according to claim 15, wherein
the first direction is a left-and-right direction, and
the thickness direction is a front-and-rear direction.

17. The display device according to claim 15, wherein
the first direction is an up-and-down direction, and
the thickness direction is a front-and-rear direction.

18. A method of manufacturing the deflector according to claim 1, the method comprising:
forming a holographic material layer on the support substrate to form the holographic element;
fixing the support substrate to the holder; and
performing interference exposure including illuminating the holographic material layer with an object beam and a reference beam.

19. The deflector according to claim 1, wherein
the holder includes an opening defined by the first fixing portion, the second fixing portion opposite from the first fixing portion in the first direction, a first coupling portion that couples one end of the first fixing portion and one end of the second fixing portion, and a second coupling portion that couples another end of the first fixing portion and another end of the second fixing portion.

20. The deflector according to claim 1, wherein
the holder further includes
a first coupling portion that extends in the first direction at a position apart from the support substrate on one side in a second direction intersecting with the first direction, and
a second coupling portion that extends in the first direction at a position apart from the support substrate on the other side in the second direction.

* * * * *